Patented June 4, 1929.

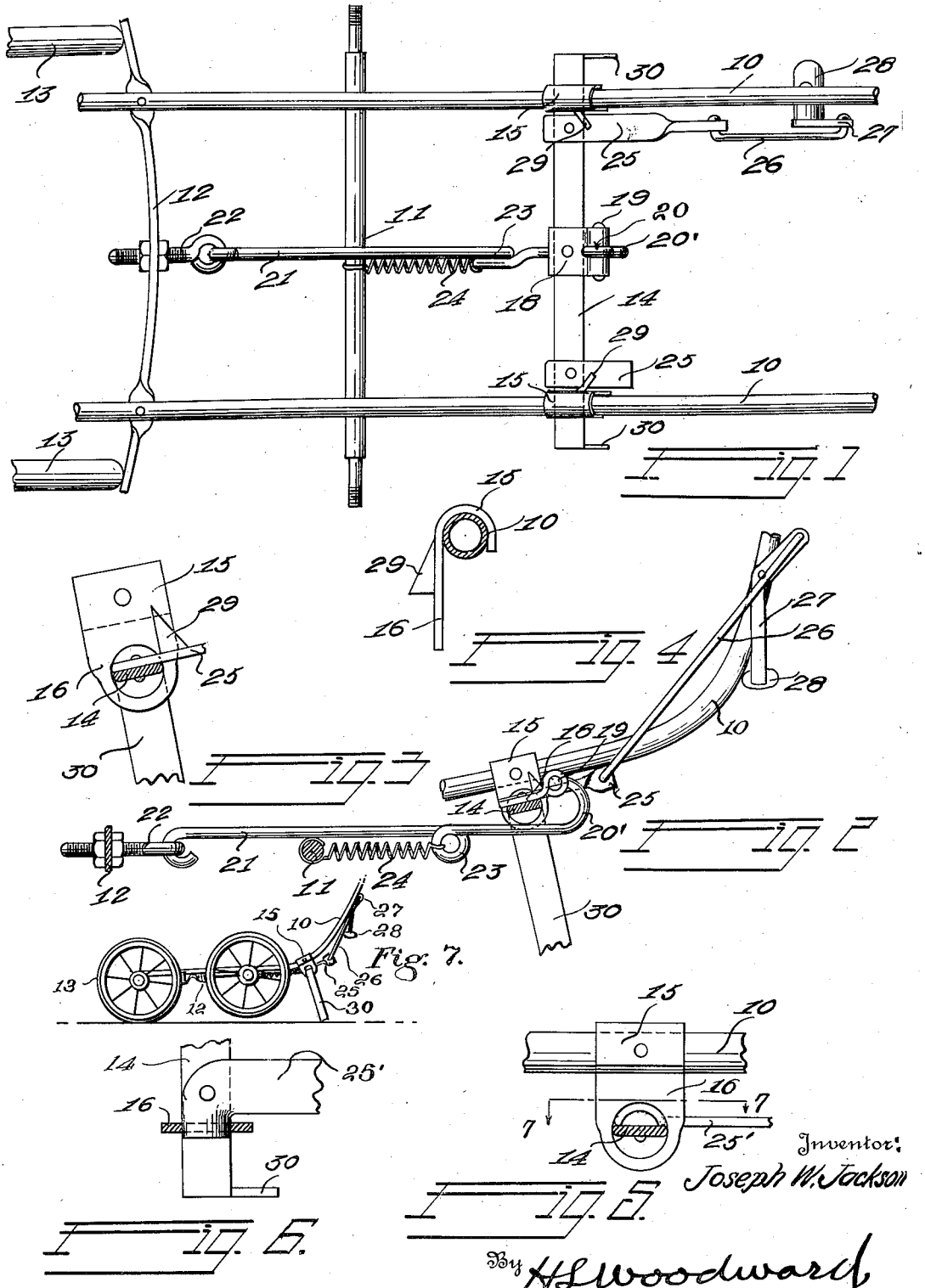

1,715,555

UNITED STATES PATENT OFFICE.

JOSEPH W. JACKSON, OF BROOKLYN, NEW YORK, ASSIGNOR TO HENRY PERLMUTTER, OF BROOKLYN, NEW YORK.

BRAKE CONSTRUCTION.

Application filed September 13, 1928. Serial No. 305,765.

The invention has for an object to effect improvements in brake constructions in baby carriages. The invention has for an object to effect improvements especially in perambulators, although it may be otherwise constructed and applied for other uses; and aims to effect certain novel functions contributing to the safety of such appliances, and also improvements looking to the increased ease of operation of the brake with safety. It is also an aim to present improvements in specific construction of details to facilitate the manufacture of the appliance and also effect improvements novel in other respects.

A particular aim of the invention is to present a brake having a dead center link connection which may be readily operated by the hand or foot and will be automatically moved to terminal applied position beyond dead center position.

Additional objects, advantages and features of invention reside in the construction, arrangement, and combination of parts, as will be understood from the following description and accompanying drawings, wherein, Figure 1 is a plan view of a running gear equipped with the brake in one embodiment.

Figure 2 is a side view thereof, parts being omitted.

Figures 3 and 4 are details of the rock shaft mounting.

Figure 5 is similar to Figure 3 in a modification.

Figure 6 is a top view of Figure 5 with the hanger broken away.

Figure 7 is a side elevation of the complete running gear with the brake in operated position.

There is illustrated a carriage the running gear frame of which includes two longitudinal side members 10, which may be mounted upon the axle shafts 11 as usual the rear axle only being shown. The body of the carriage and the frame may be supported and coordinated in accordance with approved practices in the art, my brake construction being adapted to various constructions in this respect.

In the present instance, I have illustrated a flexible brake beam 12, mounted upon the longitudinal members 10, although other forms and mounting of brake beam may be employed, if desired. The beam in the present instance is of that type which has a link connection at its middle part, drawing upon which bends the beam and causes its outer ends, projecting beyond the side members 10, to bear upon the tires of the front wheels 13.

Upon the side members 10 rearwardly of the rear axle 11 a short distance, a rock shaft 14 is mounted extending transversely of the frame and having respective ends supported revolubly on the side members. This support is effected by means of hangers 15 shown in detail in Figures 3 and 4. These are formed of sheet metal, each having one end bent to fit snugly over the respective member 10 and riveted or welded thereto, and a depending ear 16 at the inner side apertured at its lower part to receive the shaft 14 revolubly therein. The shaft 14 is formed of a piece of substantial strap metal with rounded edges to afford a good journal in the ear 16. Centrally of the bar a knuckle 18 is secured thereon comprising a short length of strap metal having a bifurcated end with alined roll edges to receive a pin 19 snugly therein. The furcation receives loosely therein, and the pin engages through, an eye 20 at the rear upturned end 20' of a brake link 21 the forward end of which is connected centrally to the brake beam 12 by means of an adjustable eye-bolt 22 the stem of which is inserted through an aperture in the beam and held by nuts on each side of the beam. The link 21 is formed of a rod bent to form the eye 20 and a similar eye at the opposite end by which it is secured in the bolt 22, and also an intermediate eye 23 is formed in the link a short distance forwardly of the rock shaft 14. Engaged with this eye 23 there is a contractile helical spring 24, the forward end of which is anchored on the rear axle 11, which is located a distance forwardly of the eye 23. The spring is under tension tending to draw the link forward. An arm 25 also of strap sheet metal is riveted upon and radial to the shaft 14 close to the right hand hanger 15, the outer end of the arm being connected by a link 26 to an operating bell crank lever 27 pivoted upon the side member 10 of the running gear frame. This lever is substantially L-shaped, pivoted at its angle, the link 26 being secured to the end of its short arm while a longer arm is provided having one end 28 turned laterally and covered with rubber to strike against the side member 10 at opposite limits of movement of the lever, and serving as a pedal and handle. The lever is pivoted upon the inner side of the member 10, and the lever so shaped that when the handle 28 strikes the member 10 at the lower limit of movement of the handle the short arm at the point of attachment of the link 26 will be past dead center between the pivot of the link and the end of the arm 25, so that the tension applied upon the brake beyond that point will hold the parts in brake-applied position. With the lever 27 in the last mentioned position, the arm 25 is drawn upwardly and the knuckle 18 swung rearwardly and upwardly, drawing upon the link 21 in such manner as to flex the beam 12 and cause application of the brake as indicated. At this position of the parts, also, the pin 19 of the knuckle 18 will be a little past and above dead center. When it is desired to release the brake the handle 28 is drawn upwardly and as soon as the knuckle 18 and link 26 pass dead center the spring 24 functions to draw the link 21 forward and release the brake.

I have provided an additional safety element coordinated in structure and function with the brake structure described, whereby in addition to the brake being applied, the vehicle will be supported against liability of casual tilting backwardly which often occurs in the handling of baby carriages with serious injury to infants. In addition, the last mentioned coordination serves as an additional brake for the vehicle so that in case of excessive wear of the tires and neglect to adjust the eye-bolt 22 at the connection of the brake-beam, when a failure to effect proper application might occur, my device will insure against accidents. It also functions to cause a full stroke movement of the operating lever 27 as will be explained.

Each hanger 15 is provided with a rearward extension 29 which is bent inwardly and provided with a lower-edge portion which will extend over the arm 25 at the right hand side and a short stud arm 25' secured upon the shaft 14 at the opposite side, so as to check movement of the rock shaft at a predetermined extreme position on application of the brake. The extremities of the shaft 14 are extended laterally outward beyond the hangers 15 and bent downwardly to provide legs 30, which, when the brake is in applied position, extend downwardly slightly to the rear to a distance slightly below the level of the bottoms of the rear wheels, so that the carriage will be supported at that time upon these legs and by the front wheels. When the brake is released, under action of the spring 24 the movement of the parts is such that the legs 30 will be swung up close beneath the side members 10 of the running gear frame, the extremities of the legs being turned inwardly so as to strike the under sides of the members 10 and check movement of the parts toward release position. This movement is also sufficient to release the brake-beam 12, which by its inherent resiliency will unbend or bend oppositely from its applied form so as to clear its extremities from the wheels.

It should be noted that the connections are so proportioned that in applying movement the legs 30 pass rearwardly of their vertical position before the lever 27 reaches dead center. Under this arrangement, the brake will immediately release itself by retraction of the beam and the spring 24 if the operator removes his hand or foot before such dead center position of the lever 27 is reached, attracting attention and calling for repeated operation of the brake. While if the hand or foot is removed just at or short of dead center of lever 27 where friction would otherwise cause the parts to remain for a time (with liability of release movement), the legs 30 will function to complete the application carrying lever 27 past dead center.

It is a tendency of persons applying foot-operated brakes on baby carriages to remove the foot from the operating pedal too soon, when the brake parts reach a point where the link 26 is on, slightly past, or has not quite attained, dead center. Ordinary brake parts will remain in such positions for a time by reason of friction in the parts and are liable to casual or self release action. In my brake, if the link 26 is brought to any of these positions, engagement of the legs 30 with the ground slightly to the rear of a vertical line to the axis of the rock shaft 14 will, by reason of the weight of the carriage and action of gravity, cause completion of the movement of the parts so that they will be secured against casual release by movement of the link 26 past dead center, where it will be held by the tension of the beam 12 and the spring 24. Also, at the same time, that pressure is applied to the lever 27 at the handle 28, if attained by means of the hand or foot of the operator, a forward impulse is ordinarily imparted to the carriage, which, when the legs 30 engage the ground, tends to carry the carriage forward sufficiently to complete the action of the legs 30. In addition, an operator understanding the function of the device, may also apply a slight forward impulse upon the handles of the baby carriage which will secure completion of the movement of the brake parts.

If desired, the ends of the arm 25 and arm 25' may be extended laterally into the apertures of the ears 16, and to afford a better bearing, may be made transversely arcuate to fit more snugly the surfaces of the opening in the ears as indicated in Figures 5 and 6.

I claim:

1. In a brake device including a wheeled vehicle body, a brake shoe, a main operating link therefor, and a dead center means for moving the link operatively: a swinging leg mounted on the body and operatively connected with said link movable to engage the ground when the brake is in applied position.

and clearing the ground when the brake is in released position, said leg being connected to move from inoperative position past vertical ground engaging position on operative movement of the brake device before said dead center means reaches dead center.

2. A brake comprising a frame, brake shoes, an operating link connected therewith, a cranked operating device connected with the link resilient means opposing operative movement of the link, the connection of the link with said cranked device being arranged to pass dead center on application movement, means to stop said movement at a predetermined limit past dead center, and pivoted ground-engaging legs connected with the operating device adapted to lie in lifted position in release poistion of the parts, and movable into engagement with the ground on application of the brake, said legs being connected and arranged to move past vertical position under application movement of the parts before said operating device reaches dead center position.

3. A brake comprising a wheeled frame, brake shoes mounted thereon, an operating link having a connection therewith resilient means engaged with the link opposing application movement thereof and adapted to move the parts to initial position, a shaft transverse to the link having an eccentric connection with the link movable past dead center, means to stop movement of the shaft at a predetermined position past said dead center position, legs on the shaft of a length to swing into engagement with the ground past a vertical position before said eccentric connection with the link passes dead center, and operating means connected with the shaft.

4. The structure of claim 3 in which said frame includes rearward upward extensions and said operating means comprises a bell or crank lever pivoted on said upward extension, and a link connected to the bell crank lever and connected eccentrically to said shaft, said link connection with the bell crank lever being adapted to pass dead center on application movement, and means to stop the lever at a predetermined operated position.

5. A vehicle brake operating device comprising a running gear frame including lateral bearings, a rock shaft mounted therein and having an eccentric member adapted to be connected to a brake shoe for operation of the shoe, and being movable past dead center, means to stop movement of the shaft at a predetermined position past said dead center position, the ends of said shaft being provided with legs adapted to swing into engagement with the ground and lying in such a plane radial from the shaft as to pass a vertical position on operating movement of the brake before said eccentric member passes dead center position, and means to operate the shaft.

In testimony whereof I affix my signature.

JOSEPH W. JACKSON.